Patented Apr. 21, 1953

2,635,967

UNITED STATES PATENT OFFICE 2,635,967

STABILIZED CELLULOSE ESTER COMPOSITION

William M. Gearhart and Robert W. Pugh, Kingsport, Tenn., assignors to Eastman Kodak Company, Rochester, N. Y., a corporation of New Jersey No Drawing. Application February 8, 1951, Serial No. 210,098

2 Claims. (Cl. 106—178)

This invention relates to the stabilization of cellulose esters, particularly those which contain, as an impurity, a small metal content by mixing with the cellulose ester an alkali metal salt of ethylene-bis-imino-diacetic acid (ethylene diamino-N N N' N' tetra acetic acid).

Cellulose esters as prepared in the conventional manner from wood pulp or cotton linters tend to discolor at high temperatures and may even undergo chain cleavage. There is a decided disadvantage in the use of such esters in processes involving elevated temperatures, such as in molding, fabrics, etc. and, consequently, methods have been developed for stabilizing those esters against the effects of elevated temperatures. Some stabilizing materials have been suggested but the gain has been only in color stability and there has been a loss in the physical stability of the cellulose ester as evidenced by much poorer qualities after having been subjected to the effects of heat.

One object of our invention is to prepare cellulose esters which retain color and chain-length stability at elevated temperatures and which also are of good clarity. Another object of our invention is to provide a method of stabilizing cellulose esters in which alkali metal salts of ethylene-bis-imino-diacetic acid is used for the stabilizing material. Other objects of our invention will appear herein.

It is our theory that the instability of many cellulose esters as presented commercially is caused by numerous factors, one of which is the presence of certain ions or ionizable salts of some of the metals, such as copper, iron, or the like. As this material contributing to instability is mineral in nature, the addition of more mineral material often affects either the clarity, color stability or chain-length stability of the cellulose ester so that a combination of all three of these properties is sometimes difficult to achieve. We have found, however, that all three properties may be obtained in the same cellulose ester after there is incorporated in such cellulose ester a very small proportion of an alkali metal salt of an ethylene-bis-imino-diacetic acid.

Our invention comprises thoroughly incorporating in the cellulose ester from 0.01 up to 0.3 part of the alkali metal salt of ethylene-bis-imino-diacetic acid per 100 parts of the cellulose ester. The stabilizing salt may be either incorporated in the cellulose ester itself or it may be incorporated in a plastic composition in which the cellulose ester is one of the components. Our invention applies to cellulose esters of fatty acids of 2-4 carbon atoms, either simple or mixed, such as cellulose acetate, cellulose acetate butyrate, cellulose butyrate and cellulose propionate. We have found that any of the alkali metal salts of ethylene-bis-imino-diacetic acid may be employed for stabilizing purposes. Some of the stabilizing salts are the tetrasodium salt, the tetrapotassium salt, the disodium magnesium salt. Although proportions even greater than 0.3 part of the stabilizing material per 100 parts of cellulose ester may be employed, it is preferred that the proportion not be much above 0.3 part, as it is desirable to restrict the mineral content of the cellulose ester to the minimum necessary for stabilizing purposes.

We have found that when alkali metal salts of ethylene-bis-imino-diacetic acid are incorporated in cellulose ester plastic compositions, such as a composition of the ester and a plasticizer, results are such in which the flow has remained substantially the same as before the stabilizing material was incorporated therein.

The following example illustrates the retaining by the plastic material of substantially the same flow characteristics when subjected to prolonged heat as that plastic had prior to such treatment.

A composition was prepared of 100 parts of cellulose acetate and 31 parts of diethyl phthalate. The material, in each case, was tested by rolling the plastic material into a sheet and punching discs from the resultant sheet. In every case two test tubes were partially filled with the discs and were placed in a heat block at a temperature of approximately 205° C. for one and for two hours. The plastic material was then recovered and its softness was measured on a flowmeter. Also, materials in which no stabilizer was incorporated were tested as a basis of comparison. The salts were incorporated in the cellulose ester in the form of a 30% aqueous solution and by rolling the cellulose ester so-treated and plasticizer on warm rolls, the plastic material obtained became a homogeneous mass. The results obtained by heating one hour and by heating two hours were as follows:

205° heat block

| | Parts | Flow After 1 hour | Flow After 2 hours |
|---|---|---|---|
| Tetrasodium Salt | 0.01 | MS | S |
| | 0.025 | S | S |
| | 0.05 | MS | MS |
| | 0.1 | MS | M |
| | 0.3 | MS | MS |
| Tetrapotassium Salt | 0.01 | MS | M |
| | 0.025 | MS | M |
| | 0.05 | MS | MS |
| | 0.1 | MS | MS |
| | 0.3 | MS | MS |
| Magnesium Disodium Salt | 0.01 | MS | S |
| | 0.025 | S | S |
| | 0.05 | S | MS |
| | 0.1 | MS | M |
| | 0.3 | M | M |

The flow characteristics of a plastic composition are designated on the flowmeter as S, corresponding to Soft, M corresponding to Medium, or MS corresponding to Medium Soft. The values given above indicate the flow characteristics of the various plastic compositions obtained by the incorporation of plasticizer. The plastic material in which no stabilizing agent was incorporated was found to run out of the flow meter upon testing, showing that it had completely lost the flow characteristics which it possessed initially.

The plastic composition given in the example is merely illustrative and any plasticizer which has been found to be suitable for plastic compositions may be employed in compositions in accordance with our invention. Such plasticizers as dibutyl phthalate, diethyl phthalate, dibutyl sebacate-butyl stearate, triphenyl phosphate, or the like, may be employed in the preparation of stable plastic compositions as described herein.

We claim:

1. A composition of 100 parts of a cellulose ester selected from a group consisting of cellulose acetate and cellulose acetate butyrate, and 0.01 to 0.3 part of the magnesium disodium salt of ethylene-bis-imino-diacetic acid.

2. A composition of 100 parts of cellulose acetate and 0.01 to 0.3 part of the magnesium disodium salt of ethylene-bis-imino-diacetic acid.

WILLIAM M. GEARHART.
ROBERT W. PUGH.

References Cited in the file of this patent
UNITED STATES PATENTS

| Number | Name | Date |
|---|---|---|
| 2,086,543 | Dreyfus et al. | July 13, 1937 |
| 2,413,856 | Bersworth | Jan. 7, 1947 |
| 2,438,975 | Jones | Apr. 6, 1948 |
| 2,452,805 | Sussenbach | Nov. 2, 1948 |
| 2,498,750 | Birnbaum et al. | Feb. 28, 1950 |
| 2,535,360 | Koch | Dec. 26, 1950 |

FOREIGN PATENTS

| Number | Country | Date |
|---|---|---|
| 129,033 | Great Britain | July 10, 1919 |

OTHER REFERENCES

"The Modern Chelating Agent"; Tech. Bull. #1, West Coast Representative, Griffin Chem. Co., San Francisco and Los Angeles, Calif., Jan. 14, 1949, page 2.

"The Properties of Ethylene Diamino Tetra-Acetic Acid and Its Salts"; Martell et al., Bersworth Chem. Co., Framingham, Mass. (1949), pages 7 and 11.